3,321,447
PRODUCTION OF POLYLAUROLACTAM
Joachim Kunde, Frankenthal, Pfalz, Hans Wilhelm and Friedrich Mertes, Ludwigshafen (Rhine), and Erich Schwartz, Mannheim, Germany, assignors to Badische Anilin- & Soda-Fabrik Aktiengesellschaft, Ludwigshafen (Rhine), Germany
No Drawing. Filed Oct. 13, 1964, Ser. No. 403,637
Claims priority, application Germany, Oct. 18, 1963, B 73,923
1 Claim. (Cl. 260—78)

This invention relates to the polycondensation of laurolactam in the presence of a mixture of oxo acids of phosphorus or derivatives thereof and monocarboxylic and/or dicarboxylic acids, in the presence or absence of water, the polycondensation preferably being carried out without applying superatmospheric pressure.

It is known that laurolactam, which is much more difficult to polymerize than caprolactam, may be polymerized at temperatures above 300° C. in the presence of aliphatic monocarboxylic or dicarboxylic acids having more than five carbon atoms. In order to be adequately effective, the monocarboxylic or dicarboxylic acids require to be used in amounts in which they markedly affect the chain length. It is therefore difficult to prepare polylaurolactam having a high molecular weight. Monocarboxylic acids having less than five carbon atoms, such as acetic acid, are inactive as catalysts.

It is an object of this invention to prepare polylaurolactam having a high molecular weight.

Another object of the invention is to carry out the polymerization in a short time. A further object of the invention is to prepare polylaurolactam having a content of monomers of less than 2%.

Yet another object of the invention is to prepare a polylaurolactam which is colored less than polylaurolactam prepared by prior art methods.

A further object of the invention is to prepare polylaurolactam which, at comparable K-values, has a substantially lower melt viscosity than polylaurolactam prepared by conventional methods.

The objects of the invention are achieved in the polymerization of laurolactam in the presence of catalysts at elevated temperature in the presence or absence of water, by using as catalyst a mixture of (a) an oxo acid of phosphorus or a derivative thereof and (b) a carboxylic acid having one or two carboxyl groups.

Particularly suitable as component (a) of the catalyst system are phosphorous acid or hypophosphorous acid and their acid alkali metal, alkaline earth metal salts and anhydrides, polyacids obtainable by elimination of water or esters of phosphoric, phosphorous or hypophosphorous acid with aliphatic alcohols having one to five carbon atoms such as methanol, propanol or pentenol. Phosphoric acid may also be used. Acid chlorides or oxo acids of phosphorus, such as phosphorus pentachloride, phosphorus trichloride or phosphorus oxychloride are not so well suited. The said compounds may also be used mixed together.

The phosphorous acid, hypophosphorous acid or their salts are advantageously used in aqueous solution, while the polymerization of laurolactam in the presence of phosphorus compounds which are sensitive to water, such as phosphorus pentachloride, is carried out in the absence of water.

Examples of component (b) of the catalyst are carboxylic acids having one or two carboxyl groups, e.g., caproic acid, caprylic acid, capric acid, lauric acid, stearic acid, adipic acid or sebacic acid; mixtures of these acids may also be used.

Mixtures suitable as catalysts for the process according to this invention contain 0.001 to 3, preferably 0.05 to 0.5, mole percent of the said phosphous compounds, 0.01 to 5, preferably 0.5 to 2.5, mole percent of the said monocarboxylic and/or dicarboxylic acids and, when used, 5 to 50, preferably 10 to 20 mole percent of water, the molar percentages being calculated on the total amount of the laurolactam to be polymerized.

Polymerization of laurolactam in the presence of the catalysts used according to this invention is carried out at from 270° C. to lower than the decomposition point of the polylaurolactam, preferably at from 290° to 325° C., and preferably at atmospheric pressure. Temperatures are measured in the reaction mixture. The process may be carried out continuously or batchwise in apparatus known for the polymerization of lactams, for example in precondenzation pipes or kettles with or without stirring means. If amounts of from 20 to 50 mole percent of water are used for the polymerization, increased pressures of about 5 to 25 atmospheres gauge may be used. The use of larger amounts of water is possible in principle but without advantage because higher pressures are set up.

In all cases it is recommendable to carry out the polymerization under an inert gas, such as nitrogen.

The polymers are suitable for all purposes for which polyamides are used. They may be used with particular advantage where polyamides having low water absorption, good dielectric properties and high dimensional stability are required, for example for gears, bushings, screws, sheeting, for the production of powder for coatings, and also for bristles, threads and filaments.

The invention is further illustrated by the following examples. The parts and percentages specified in the examples are parts and percentages by weight.

*Example 1*

98.5 parts of laurolactam, 0.082 part of 50% aqueous phosphorous acid, 1.42 parts of stearic acid and 1 part of water are intimately mixed and the mixture is rinsed with nitrogen for two hours in a reactor. The mixture is then heated under nitrogen at about 300° C. for twelve hours. A white polyamide block is obtained. 1% by weight of low molecular weight constituents can be extracted from chips from the said block with methanol during the course of eight hours. The polyamide has a K-value according to Fikentscher of 53.4 (measured in a solution of 1 g. in 100 ml. of concentrated sulphuric acid). It is suitable for the production of moldings by injection molding.

*Example 2*

By using 2.13 parts of stearic acid instead of 1.42 parts, but otherwise following the procedure of Example 1, the polylaurolactam has 1.8% by weight of extractable constituents and a K-value of 45.2. The polyamide is suitable in the form of powder for the production of coatings by the fluidized bed method.

*Example 3*

A mixture of 98.5 parts of laurolactam, 2.13 parts of stearic acid and 0.091 part of triethyl phosphate is freed from gaseous oxygen by rinsing with nitrogen in a reactor. The mixture is then heated in a current of nitrogen for twelve hours at 300° C. After the whole has been cooled, a polyamide block is obtained. Chips made from the block are extracted with methanol in a Soxhlet apparatus for eight hours. The extractable fraction is 1.7%. The product has a K-value according to Fikentscher of 45.4.

Example 4

By using 0.1 g. of tributyl phosphate instead of triethyl phosphate and otherwise following the procedure described in Example 3, a polyamide is obtained which contains 1.35% of constituents extractable with methanol and has a K-value of 44.7.

We claim:

In a process for the production of high molecular weight polylaurolactam by polymerization of laurolactam at elevated temperatures in the presence of aliphatic carboxylic acid having more than 5 carbon atoms and having from 1 to 2 carboxy groups the improvement which comprises carrying out the polymerization at a temperature of from 290 to 325° C. in the presence of a mixture of 0.01 to 5 mol percent, based on the laurolactam, of said aliphatic carboxylic acid and 0.001 to 3 mol percent, based on the laurolactam, of a compound selected from the group consisting of phosphoric acid, phosphorous acid, hypophosphorous acid, and an ester of these oxo acids of phosphorus with an aliphatic alcohol having from 1 to 5 carbon atoms.

References Cited by the Examiner

UNITED STATES PATENTS

| | | | |
|---|---|---|---|
| 2,241,321 | 5/1941 | Schlack | 260—78 |
| 3,060,173 | 10/1962 | Von Schukh et al. | 260—78 |
| 3,216,976 | 11/1965 | Schwartz et al. | 260—78 |

FOREIGN PATENTS

| | | |
|---|---|---|
| 509,092 | 1/1955 | Canada. |
| 531,864 | 10/1956 | Canada. |
| 582,517 | 9/1959 | Canada. |
| 1,261,286 | 4/1961 | France. |
| 23,607 | 8/1962 | Germany. |
| 25,173 | 4/1963 | Germany. |
| 663,295 | 12/1951 | Great Britain. |

WILLIAM H. SHORT, *Primary Examiner.*

LOUISE P. QUAST, *Examiner.*

H. ANDERSON, *Assistant Examiner.*